United States Patent
Morisseau et al.

(10) Patent No.: US 11,233,399 B2
(45) Date of Patent: Jan. 25, 2022

(54) METHOD FOR REGULATING PARALLELED ALTERNATORS IN ORDER TO DISTRIBUTE REACTIVE LOAD

(71) Applicant: MOTEURS LEROY-SOMER, Angouleme (FR)

(72) Inventors: Vincent Morisseau, La Rochefoucauld (FR); Jérémy Fratani, Magnac-sur-Touvre (FR); Samuel Moser, Gond Pontouvre (FR); Jean-François Paillou, Orleans (FR)

(73) Assignee: Moteurs Leroy-Somer, Angouleme (FR)

( * ) Notice: Subject to any disclaimer, the term of this patent is extended or adjusted under 35 U.S.C. 154(b) by 158 days.

(21) Appl. No.: 16/480,729

(22) PCT Filed: Jan. 29, 2018

(86) PCT No.: PCT/EP2018/052171
§ 371 (c)(1),
(2) Date: Jul. 25, 2019

(87) PCT Pub. No.: WO2018/141695
PCT Pub. Date: Aug. 9, 2018

(65) Prior Publication Data
US 2021/0083481 A1 Mar. 18, 2021

(30) Foreign Application Priority Data

Feb. 3, 2017 (FR) ...................................... 1750923

(51) Int. Cl.
*H02J 3/18* (2006.01)
*H02J 3/46* (2006.01)
*H02P 9/02* (2006.01)

(52) U.S. Cl.
CPC .............. *H02J 3/1885* (2013.01); *H02J 3/46* (2013.01); *H02P 9/02* (2013.01)

(58) Field of Classification Search
None
See application file for complete search history.

(56) References Cited

U.S. PATENT DOCUMENTS 4,403,292 A * 9/1983 Ejzak ..................... B64D 47/00
700/297
7,053,503 B2 5/2006 Tange et al.
(Continued)

FOREIGN PATENT DOCUMENTS

| CN | 101924512 A | 12/2010 |
| CN | 103490425 A | 1/2014 |

(Continued)

OTHER PUBLICATIONS

International Search Report for corresponding International Application No. PCT/EP2018/052171 dated Apr. 5, 2018.
(Continued)

*Primary Examiner* — Jared Fureman
*Assistant Examiner* — Joel Barnett
(74) *Attorney, Agent, or Firm* — Pearne & Gordon LLP

(57) ABSTRACT

Method for regulating a bank of alternators comprising at least two alternators that deliver their output in parallel to a load (C), said alternators each being provided with a regulator (12, 13) that is configured to deliver an output signal representative of the reactive power level of the corresponding alternator divided by its nominal reactive power, and a control law allowing the reactive power level of the alternator to be modified depending on an input signal, method wherein a weighted signal employed as the input signal of these regulators is generated from the output signals representative of the reactive power level of each of the alterna- (Continued)

tors, i.e. the signals delivered by the corresponding regulators, so as to make each of the alternators converge to a predefined reactive power level ($T_{rp}$).

14 Claims, 3 Drawing Sheets

(56) References Cited

U.S. PATENT DOCUMENTS

| | | | |
|---|---|---|---|
| 9,484,850 B2 | 11/2016 | Hyypio et al. | |
| 2005/0040655 A1 | 2/2005 | Wilkins et al. | |
| 2010/0134076 A1 | 6/2010 | Cardinal et al. | |
| 2010/0250012 A1* | 9/2010 | Arinaga | F03D 7/048 |
| | | | 700/287 |
| 2015/0357819 A1 | 12/2015 | Pineda Amo | |
| 2016/0049891 A1* | 2/2016 | Frampton | G05B 13/021 |
| | | | 322/25 |
| 2016/0172857 A1* | 6/2016 | Itaya | H02J 3/50 |
| | | | 700/298 |
| 2016/0237990 A1* | 8/2016 | Ubben | F03D 7/048 |

FOREIGN PATENT DOCUMENTS

| | | |
|---|---|---|
| EP | 1 508 951 A1 | 2/2005 |
| EP | 2 722 955 A2 | 4/2014 |

OTHER PUBLICATIONS

Written Opinion for corresponding International Application No. PCT/EP2018/052171 dated Apr. 5, 2018.
French Search Report dated Oct. 10, 2017 for corresponding French Application No. 1750923.

* cited by examiner

METHOD FOR REGULATING PARALLELED ALTERNATORS IN ORDER TO DISTRIBUTE REACTIVE LOAD

FIELD OF THE INVENTION

The present invention relates to the management of a bank of alternators that deliver their output in parallel to a load.

BACKGROUND OF THE INVENTION

When the alternators of a bank of alternators are coupled in parallel and deliver power to the terminals of a load, it is important, for the correct operation of the bank, for reactive load to be correctly distributed between all the alternators. Specifically, the reactive power has an impact on the value of the excitation current of the alternator, and thus has a direct influence on the stress placed on the electric machine and on the ageing thereof. A good distribution of reactive load ensures balanced stress of such paralleled alternators.

One known method for achieving this load distribution is the so-called reactive-droop method.

Patent application EP 2 722 955 describes a voltage regulator that employs the so-called reactive-droop method to regulate a system of parallel alternators.

The reactive-droop method, which is illustrated in FIG. 1, is based on the measurement of the reactive power delivered by the alternator, expressed in percent nominal kilovolt-ampere reactive (kVAr). The higher the delivered reactive power, the greater the decrease in voltage, this decrease being proportional to the gradient of the straight line of the droop. Thus, when an alternator A is coupled with other alternators that are already delivering power to a load, the voltage of the alternator A is equal to its open-circuit voltage, as no load is present across its terminals during the coupling, and the average voltage of the other alternators is lower than their open-circuit voltage because they are loaded with the load. As naturally reactive load shifts toward the highest voltage, the voltage of the alternator A will gradually decrease as it is loaded, and the voltage of the other alternators will increase, until they all reach an equilibrium point.

Reactive droop allows powers to still be measured with the regulator and an additional alternator to be easily added since it is enough to have identical settings for open-circuit voltage and reactive-droop coefficient. In contrast, for an ideal operation, all the alternators must be set to have the same open-circuit voltage and the same droop gradient. In case of misadjustment of one of these two parameters, the load is no longer correctly shared. Commissioning is thus tricky. Furthermore, since voltage varies depending on droop gradient, the voltage setpoint is not maintained whatever the load.

Another known method is the so-called cross-current-compensation method.

U.S. Pat. No. 7,053,503 describes a system for controlling power using the cross-current-compensation method, which consists in distributing the reactive loads between the various parallel electric machines using a loop physically produced between the current measurements of the alternators. As illustrated in FIG. 2, the load is shared via a current loop created between transformers for measuring stator current. In load equilibrium or when open-circuit, the currents input into each regulator are zero. Thus, the power measurement by the regulator is not possible. The voltage setpoint is always kept at the value of the open-circuit voltage, whatever the reactive load.

The cross-current-compensation method allows a stable voltage setpoint to be achieved and reactive load to be distributed between alternators correctly, even if the open-circuit voltage of each alternator is misadjusted, and allows potential misadjustments of droop gradient to be compensated for, since it is used only to set how fast the voltage setpoint is reached.

However, this method requires a complex cabling scheme. A rigorous creation of a current loop between a plurality of alternators may lead to problems with isolation. The addition of an additional alternator thus requires complete modification of the loop. Furthermore, resistances must be determined depending on the regulator, on the nominal reactive power of the electric machine and on the ratio of the transformer for measuring the stator current, and switches must be used to short-circuit an alternator not coupled to the load. A portion of the so-called reactive-droop method must be used in the regulator to allow the voltage setpoint to be increased and decreased. The measurement of powers with the regulators must be carried out via another current-measurement input.

Apart from reactive droop and the cross-current-compensation method, there is in the prior art another method that consists in sharing reactive loads between regulators using a link according to standard RS485. This allows the reactive-droop voltage drop to be compensated for. This method amounts to sharing, via a fieldbus, the total load present across the terminals of alternators that are connected in series. The load value to be supplied by each alternator is then determined via a simple proportionality, the voltage setpoint being corrected accordingly.

There is a need to further improve methods for distributing reactive load between alternators operating in parallel, in particular in order to ensure a balanced stress of the latter.

BRIEF SUMMARY OF THE INVENTION

The aim of the invention is to meet this need, and it does so, according to one of its aspects, by virtue of a method for regulating a bank of alternators comprising at least two alternators that deliver their output in parallel to a load, said alternators each being provided with a regulator that is configured to deliver an output signal representative of the reactive power level of the corresponding alternator divided by its nominal reactive power, and a control law allowing the reactive power level of the alternator to be modified depending on an input signal, method wherein a weighted signal employed as the input signal of these regulators is generated from the output signals representative of the reactive power level of each of the alternators, i.e. the signals delivered by the corresponding regulators, so as to make each of the alternators converge to a predefined reactive power level.

By virtue of the invention, it is possible, with a simplified cabling scheme and while keeping power measurements available, to share reactive load between various alternators operating in parallel, without requiring the addition of additional transformers, and while ensuring that the delivered voltage is permanently equal to the voltage setpoint, whatever the value of the applied load.

By virtue of the invention, all the paralleled alternators deliver, to the load, the same predefined reactive power level, and the exchange of reactive current between alternators is also avoided. An additional alternator may be easily added to the alternators already in place, without having to modify the cabling scheme of the regulation and the configuration of the other alternators. Preferably, the weighted signal is the arithmetic mean of the output signals representative of the reactive power level of each of the alternators. The invention allows the reactive power delivered by an alternator to be compared to the average reactive power of all the alternators operating in parallel.

The reactive power level of an alternator is preferably expressed in percent of its nominal reactive power.

The predefined reactive power level advantageously corresponds to an equilibrium point, in particular calculated by dividing the value of the load by the sum of the nominal reactive powers of all the alternators and expressed in percent.

The predefined reactive power may correspond to the average of the reactive power levels of all the paralleled alternators. During the execution of the regulating method according to the invention, each of the alternators advantageously converges to the same reactive power level.

The control law advantageously uses the fact that, when alternators are coupled in parallel, an alternator having a voltage lower than the average of the voltages will deliver a lower reactive power, whereas an alternator having a voltage higher than the average will deliver a higher reactive power.

According to one advantageous feature, a new voltage setpoint is calculated for each regulator depending on a discrepancy between the current reactive power level and the level corresponding to the input signal, this new voltage setpoint allowing the reactive power level of the alternator to be shifted in order to bring it closer to the predefined power level.

The control law advantageously allows, at any time, the difference between the current reactive power level of an alternator and the weighted signal to be calculated. Depending on this difference, the voltage setpoint of the alternator in question is preferably modified along a straight line of parameterizable gradient, in order in particular to bring the reactive power level of the alternator closer to the predefined power level.

According to the invention, the output signals may be weighted in an analog manner. As a variant, the output signals are weighted in a digital manner.

Yet another subject of the invention, according to another of its aspects, is a bank of alternators comprising at least two alternators that deliver their output in parallel to a load, said alternators each being provided with a regulator that is configured to deliver an output signal representative of the reactive power level of the corresponding alternator divided by its nominal reactive power, and a control law allowing the reactive power level of the alternator to be modified depending on an input signal,
the regulators receiving as input a weighted signal generated from output signals representative of the reactive power level of each of the alternators so as to make each of the alternators converge to a predefined reactive power level.

Each alternator may deliver its reactive power level via an analog output configured to deliver a voltage.

In this case, the input of each regulator may be configured to receive a voltage. The output signals are preferably weighted by an analog centralization circuit.

The centralization circuit may advantageously join at a common point connected to the analog inputs the various analog outputs coming from the regulators using resistors, in particular of identical resistances.

As a variant, the output signals are weighted by a digital centralization circuit.

Preferably, the centralization circuit is an external system of programmable-logic-controller type.

Each regulator advantageously delivers the reactive power level of its alternator over a digital communication bus of the type called a fieldbus.

Preferably, the centralization circuit reads the reactive power level of each regulator, determines a weighted signal and sends it to each regulator via said digital communication bus.

BRIEF DESCRIPTION OF THE DRAWINGS

The invention will be better understood on reading the following description of nonlimiting examples of implementation thereof, and on examining the appended drawing, in which.

DESCRIPTION OF EXAMPLE EMBODIMENTS

Figure 1:
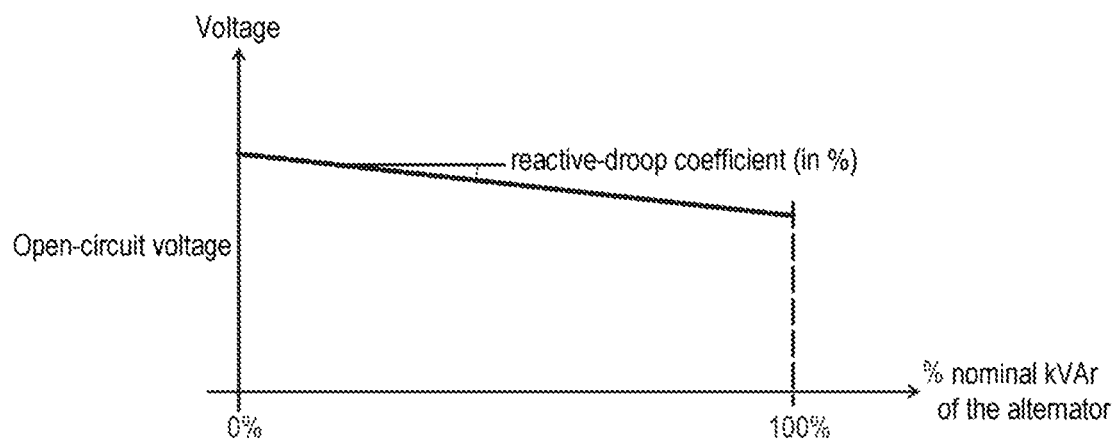
FIG. 1, which was described above, shows a so-called "reactive-droop" voltage control-law curve according to the prior art, FIG. 2, which was described above, schematically illustrates a set of paralleled alternators regulated using the cross-current-compensation method according to the prior art.
Figure 2:
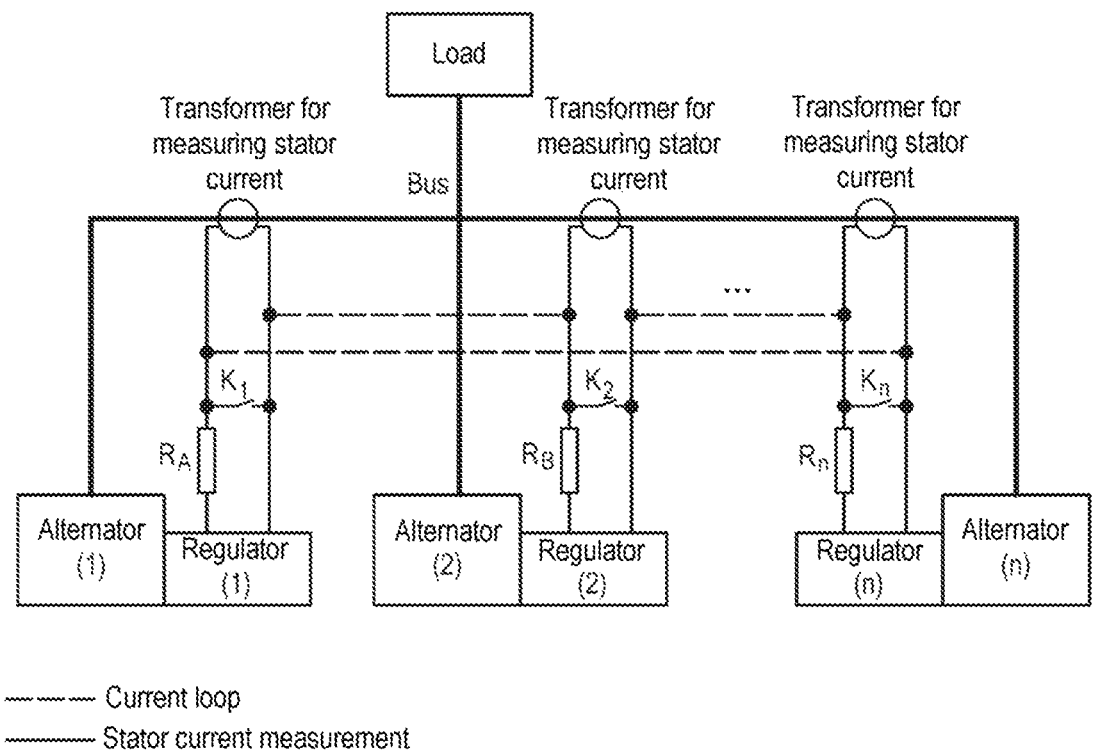
Figure 3:
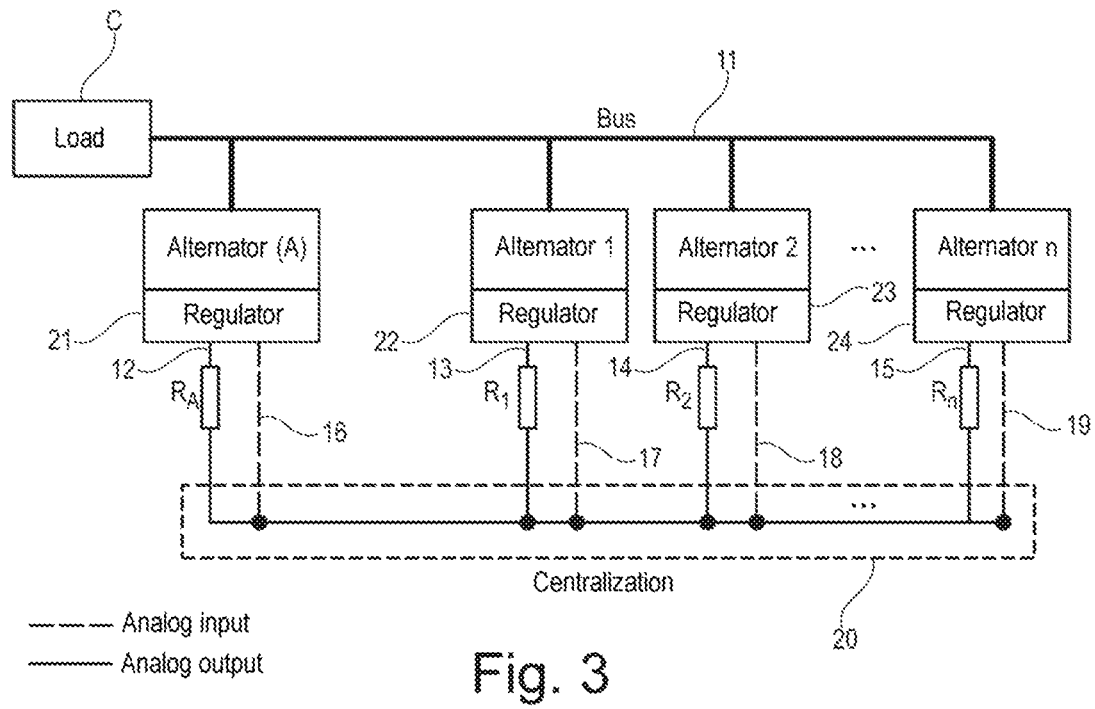
FIGS. 3 and 4 are schematics of a bank of alternators according to the invention, with an analog and digital centralization circuit, respectively.

FIG. 3 schematically shows a bank of N alternators delivering their output in parallel to a load C via a bus 11. Each alternator comprises a regulator 21, 22, 23, 24.

In this example, each alternator delivers, via an analog output 12, 13, 14, 15 configured to deliver a voltage, its reactive power level divided by its nominal reactive power.

An analog centralization circuit 20, which weights the output signals representative of the reactive power level of each of the alternators, is formed by joining at a common point the various analog outputs 11, 12, 13, 14 coming from each regulator 21, 22, 23, 24 by way of resistors $R_A$, $R_1$, $R_2$ ... Rn.

These resistors $R_A$, $R_1$, $R_2$ ... Rn are advantageously of identical resistance if the weighted signal corresponds to the arithmetic mean of the output signals representative of the reactive power level of each of the alternators. In one variant, the resistors $R_A$, $R_1$, $R_2$ ... Rn have different resistances.

The common point of the centralization circuit 20 is then joined to an analog input 16, 17, 18, 19 of each regulator 21, 22, 23, 24, which input is configured to receive a voltage, in order to measure a weighted reactive power level of all the paralleled alternators.

Preferably, the weighted level corresponds to an average level.

As explained above, a control law is then applied by each of the regulators 21, 22, 23, 24 so as to make each of the alternators converge to a predefined reactive power level.

Preferably, the predefined reactive power level corresponds to the average of the reactive powers of all the paralleled alternators.

Figure 4:
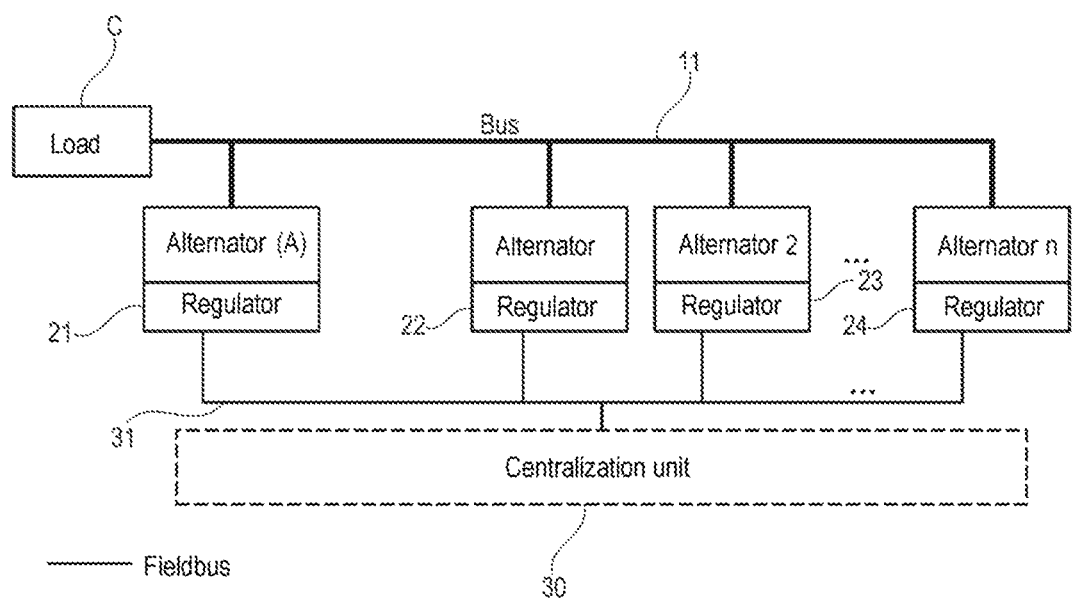

FIG. 4 schematically shows the case where the N alternators are connected to a digital centralization circuit 30 via a digital communication bus 31 of the type called a fieldbus. In the described example, the digital centralization circuit 30 is an external system of programmable-logic-controller type.

Each regulator 21, 22, 23, 24 delivers over the fieldbus 31 the reactive power level of the corresponding alternator.

The centralization circuit 30 reads the reactive power level of each alternator, calculates a weighted reactive power level and sends it to each regulator 21, 22, 23, 24 via the fieldbus 31.

Preferably, the weighted reactive power level corresponds to the average reactive power level of all the paralleled alternators.

As explained above, a control law is then applied by each of the regulators 21, 22, 23, 24 so as to make each of the alternators converge to a predefined reactive power level. Preferably, the predefined reactive power level corresponds to the average of the reactive powers of all the paralleled alternators.

Figure 5:
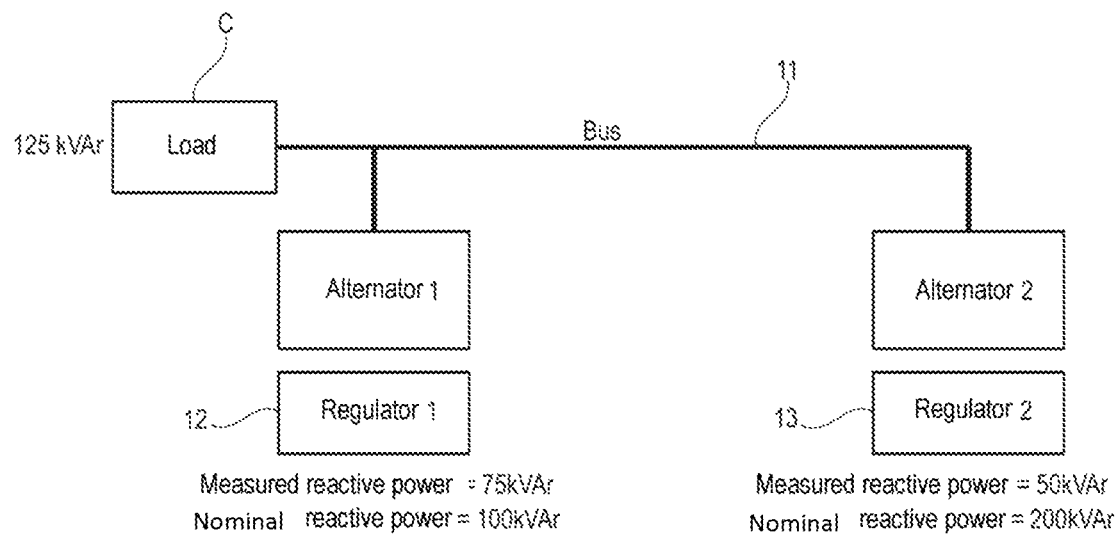
FIG. 5 illustrates an example of distribution of reactive load according to the invention.

FIG. 5 illustrates an example of distribution of reactive load according to the invention.

Two alternators 1 and 2 of different nominal reactive powers, equal to 100 kVAr and 200 kVAr, respectively, deliver their output to a reactive load C of 125 kVAr via a bus 11. The reactive powers measured on the two alternators at the time t are 75% and 25% of their nominal powers, respectively. The average value of the reactive power level at this time is 50%. The predefined reactive power level $T_{rp}$ is, in this example, 41.6%, corresponding to an equilibrium point calculated by dividing the value of the load C by the sum of the nominal reactive powers of the two alternators 1 and 2: $T_{rp}=125/(100+200)\times100=41.6\%$.

The control law of the regulator 1 will make the reactive power of the alternator 1 decrease and the control law of the regulator 2 will make the reactive power of the alternator 2 increase, such that the two alternators converge to 41.6% of their nominal reactive power.

Figure 6:
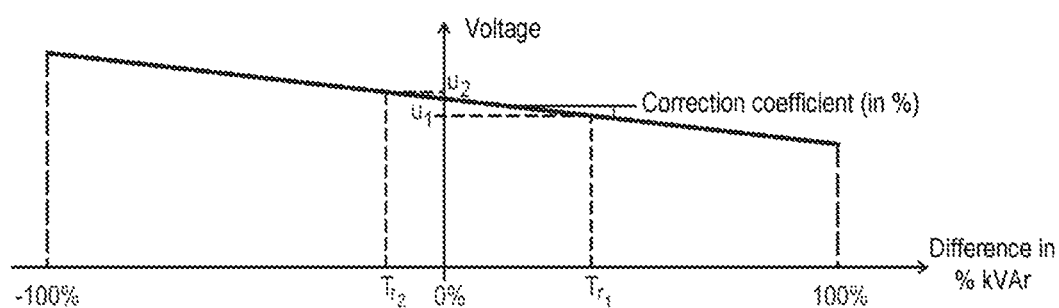
FIG. 6 shows an example control law according to the invention.

FIG. 6 shows an example voltage control law according to the invention. The x-axis corresponds to the discrepancy between the reactive power level of the voltage in question and the weighted level of the reactive powers of all the paralleled alternators.

As explained above, the control law advantageously calculates, at any given time, the difference between the current reactive power level of an alternator, in particular expressed in percent of its nominal reactive power, and the weighted level of the reactive powers of all the paralleled alternators. Depending on this difference, the voltage set point of the alternator in question is preferably modified along a straight line of parameterizable gradient, as shown in FIG. 6, in order to bring the reactive power level of the alternator closer to the predefined power level.

By way of example, the voltage regulation of the two alternators of FIG. 5 has been shown in FIG. 6. The difference in power level, represented on the x-axis, which, as described above, corresponds to the difference between the reactive power level of each alternator and the predefined reactive power level, is equal to $T_{r1}=75-41.6=33.6\%$ for the first alternator 1 and $T_{r2}=25-41.6=-16.6\%$ for the second alternator 2. The projection of the straight voltage-setpoint line onto the y-axis gives the respective voltage values $u_1$ and $u_2$ with which the set-point voltages of the two alternators 1 and 2 delivered as input to the regulators 12 and 13 must be modified in order to achieve a balanced load distribution according to the invention.

The invention is not limited to the example that has just been described. For example, other regulating measures may be combined with the invention.

The alternators of the bank of alternators according to the invention may be identical, or vary in size, nominal power and/or model. The invention in particular relates to any alternator regulator comprising one or more microcontrollers.

The invention claimed is:

1. A method for regulating a bank of alternators comprising at least two alternators that deliver their output in parallel to a load, said alternators each being provided with a regulator configured to deliver an output signal representative of a reactive power level of a corresponding alternator divided by its nominal reactive power, and a control law allowing the reactive power level of the alternator to be modified depending on an input signal, the method comprising:

generating a weighted signal from the output signals delivered by the corresponding regulators, and receiving the weighted signal as the input signal to the regulators so as to make each of the alternators converge to a predefined reactive power level.

2. The method according to claim 1, the weighted signal being the arithmetic mean of the output signals representative of the reactive power level of each of the alternators.

3. The method according to claim 1, a new voltage setpoint being calculated by each regulator depending on a discrepancy between the current reactive power level and the level corresponding to the input signal, this new voltage setpoint allowing the reactive power level of the alternator to be shifted in order to bring it closer to the predefined reactive power level.

4. The method according to claim 1, the output signals being weighted in an analog manner.

5. The method according to any of claim 1, the output signals being weighted in a digital manner.

6. A bank of alternators comprising at least two alternators that deliver their output in parallel to a load, said alternators each being provided with a regulator configured to deliver an output signal representative of a reactive power level of a corresponding alternator divided by its nominal reactive power, and a control law allowing the reactive power level of the alternator to be modified depending on an input signal, the regulators receiving as the input signal a weighted signal generated from the output signals representative of the reactive power level of each of the alternators so as to make each of the alternators converge to a predefined reactive power level.

7. The bank according to claim 6, each alternator delivering its reactive power level via an analog output configured to deliver a voltage.

8. The bank according to claim 7, the input of each regulator being configured to receive a voltage.

9. The bank according to claim 7, the output signals being weighted by an analog centralization circuit.

10. The bank according to claim 9, the centralization circuit joining at a common point connected to the analog inputs the various analog outputs coming from the regulators using resistors.

11. The bank according to claim 6, the output signals being weighted by a digital centralization circuit.

12. The bank according to claim 11, the centralization circuit being an external system of programmable-logic-controller type.

13. The bank according to claim 11, each regulator delivering the reactive power level of its alternator over a digital communication bus.

14. The bank according to claim 13, the centralization circuit reading the reactive power level of each regulator, determining a weighted signal and sending it to each regulator via said digital communication bus.

* * * * *